(12) United States Patent
Sajayan et al.

(10) Patent No.: US 8,117,398 B2
(45) Date of Patent: Feb. 14, 2012

(54) PREFETCH TERMINATION AT POWERED DOWN MEMORY BANK BOUNDARY IN SHARED MEMORY CONTROLLER

(75) Inventors: Sajish Sajayan, C.V. Raman Nagar (IN); Alok Anand, Bangalore (IN); Sudhakar Surendran, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 562 days.

(21) Appl. No.: 12/356,316

(22) Filed: Jan. 20, 2009

(65) Prior Publication Data

US 2009/0187715 A1 Jul. 23, 2009

Related U.S. Application Data

(60) Provisional application No. 61/022,008, filed on Jan. 18, 2008.

(51) Int. Cl.
*G06F 13/00* (2006.01)
*G06F 13/28* (2006.01)

(52) U.S. Cl. ................... 711/137; 711/E12.004

(58) Field of Classification Search .......... 711/137, 711/E12.004
See application file for complete search history.

(56) References Cited

U.S. PATENT DOCUMENTS

| | | | | |
|---|---|---|---|---|
| 5,928,365 | A * | 7/1999 | Yoshida | 713/324 |
| 2007/0136534 | A1* | 6/2007 | Mesard et al. | 711/137 |
| 2008/0183903 | A1* | 7/2008 | VanStee et al. | 710/5 |

* cited by examiner

*Primary Examiner* — Edward Dudek, Jr.
(74) *Attorney, Agent, or Firm* — Robert D. Marshall, Jr.; W. James Brady; Frederick J. Telecky, Jr.

(57) ABSTRACT

A prefetch scheme in a shared memory multiprocessor disables the prefetch when an address falls within a powered down memory bank. A register stores a bit corresponding to each independently powered memory bank to determine whether that memory bank is prefetchable. When a memory bank is powered down, all bits corresponding to the pages in this row are masked so that they appear as non-prefetchable pages to the prefetch access generation engine preventing an access to any page in this memory bank. A powered down status bit corresponding to the memory bank is used for masking the output of the prefetch enable register. The prefetch enable register is unmodified. This also seamlessly restores the prefetch property of the memory banks when the corresponding memory row is powered up.

4 Claims, 2 Drawing Sheets

PREFETCH TERMINATION AT POWERED DOWN MEMORY BANK BOUNDARY IN SHARED MEMORY CONTROLLER

CLAIM OF PRIORITY

This application claims priority under 35 U.S.C. 119 (e) (1) to U.S. Provisional Application No. 61/022,008 filed Jan. 18, 2008.

TECHNICAL FIELD OF THE INVENTION

The technical field of this invention is prefetch control for shared memories in a multiprocessor system.

BACKGROUND OF THE INVENTION

This invention is applicable to a multiprocessor system using a shared memory controller supporting access to memories that are arranged in banks which can be individually powered down. The shared memory controller supports consecutive speculative prefetch accesses to the memories based on the last access made by a CPU. The shared memory controller stores prefetched data in buffers. A read access to data already stored in a prefetch buffer reduces latency on such subsequent accesses. It is possible for the speculative prefetch accesses to cross memory bank boundaries from a memory bank that is powered up to one that is powered down.

Accessing a powered down memory row may result in corrupt data being stored in the prefetch buffer. This potentially corrupts data in memory as well. To prevent this from happening, the powered down memory must be woken up before the prefetch request is dispatched. The prefetch requests are only speculative access and have a low priority resulting in a long latency. Generally the software is written so that a prefetch is confined to powered memory banks. Thus the overhead incurred in waking up the memory is unnecessary and may result in additional power consumption, since the unused row may remain powered up.

SUMMARY OF THE INVENTION

This invention is a prefetch scheme which disables the prefetch when an address falls within a powered down memory bank. The shared memory controller includes a register having a bit corresponding to each independently powered memory bank. This register determines whether that memory bank is prefetchable or not. When a memory bank is powered down, all bits corresponding to the pages in this row are masked so that they appear as non-prefetchable pages to the prefetch access generation engine. This prevents it from making an access to any page in this memory bank. A powered down status bit corresponding to the memory bank is used for masking the output of the prefetch enable register. The contents of the register remain unmodified. This also seamlessly restores the prefetch property of the memory banks when the corresponding memory row is powered up.

A powered down memory bank is not woken up for a speculative prefetch access. This does not negate any power advantages of powering down memory banks. The prefetch property of the memory banks are dynamically adapted to the power down status of the memory rows. This avoids software intervention to update the prefetch control register every time the powerdown status of a memory row changes.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
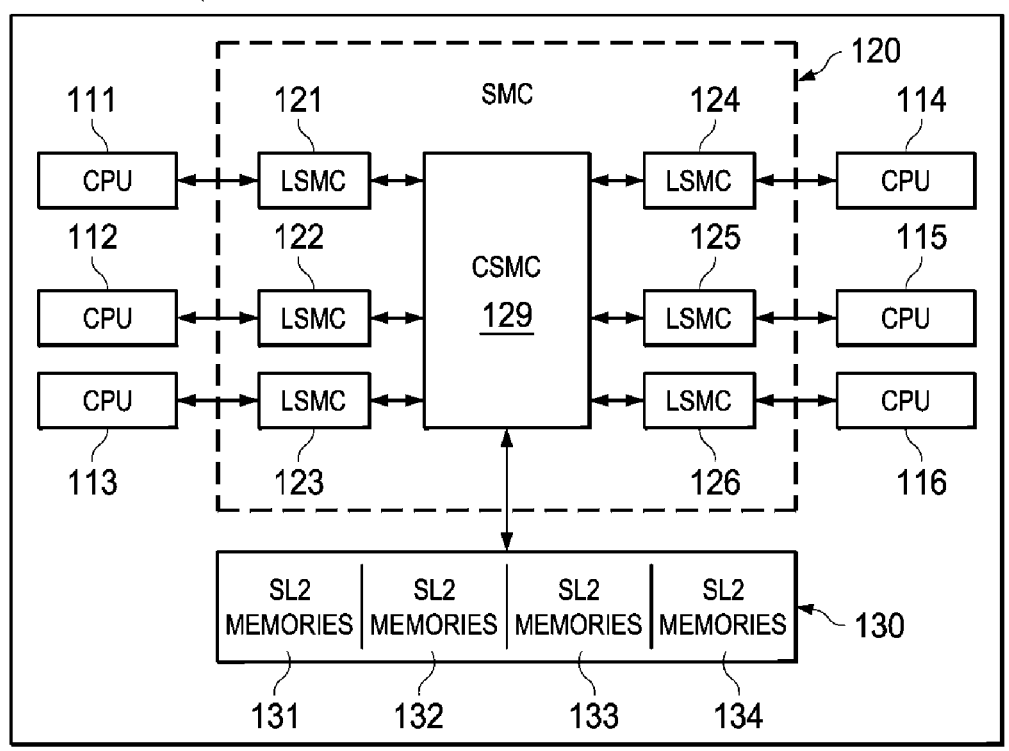
FIG. 1 is a block diagram of a multiprocessor system integrated circuit using shared memory.

This invention is useful in a multiprocessor integrated circuit such as illustrated in FIG. 1. Example multiprocessor integrated circuit 100 includes: six central processing units 111, 112, 113, 114, 115 and 116; a shared memory controller 120 including six local shared memory controllers 121, 122, 123, 124, 125 and 126 connected to corresponding central processing units and central shared memory controller 129; and shared memory 130 including separately energizable memory banks 131, 132, 133 and 134. Multiprocessor integrated circuit 100 includes plural central processing units sharing a common memory. Note the number of central processing units and memory banks shown in FIG. 1 is exemplary only. This architecture creates problems solved by this invention.

Each of the central processing units 111 to 116 is a stand-alone programmable data processor. In the preferred embodiment these have the same instruction set architecture (ISA). This is known as homogenous multiprocessing. However, this invention is also applicable to heterogeneous multiprocessing in which the central processing units employ two or more ISAs. Each central processor preferably includes a processing core for data processing operations, a data register file for temporary storage of operand data and results data and instruction and data cache. Each central processing unit operates under its own program. Each central processing unit uses shared memory controller 120 to access programs and data in shared memory 130.

Shared memory controller (SMC) 120 interfaces central processing units 111, 112, 113, 114, 115 and 116 to shared memory 130. In the preferred embodiment shared memory 130 is at the same level in the memory hierarchy as second level (L2) cache in central processing units 111, 112, 113, 114, 115 and 116. SMC 120 includes: Local SMC (LSMC) and Central SMC (CSMC). This partition is done to keep the GEM specific logic in the LSMC and the memory bank specific logic in the CSMC.

Figure 2:
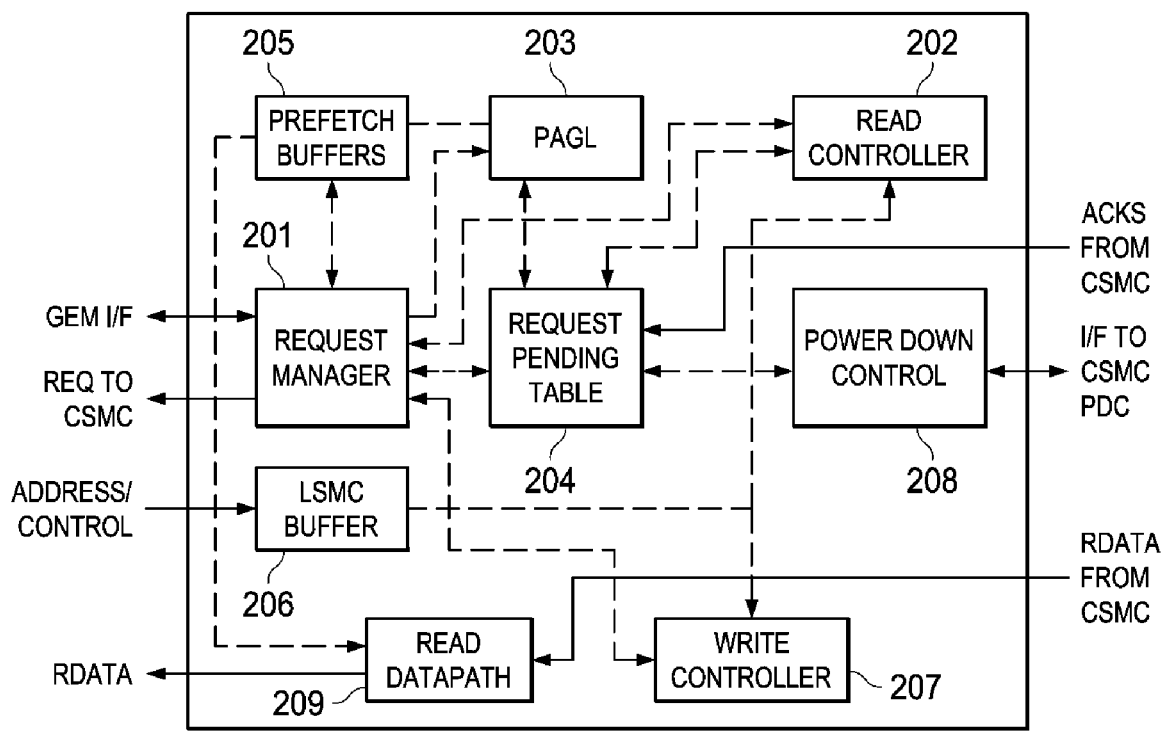
FIG. 2 is a block diagram of the local shared memory controller corresponding to one of the processors of the multiprocessor system.
Figure 3:
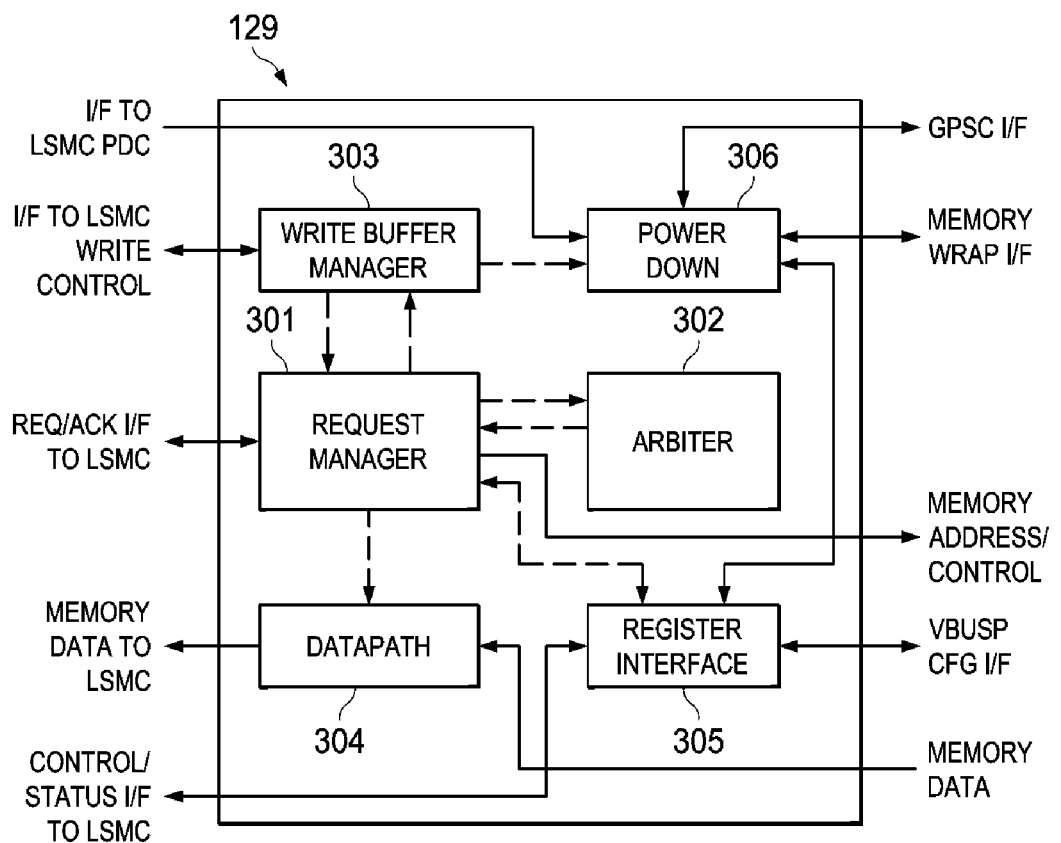
FIG. 3 is a block diagram of the central shared memory controller of the multiprocessor system.

FIG. 2 illustrates an exemplary local shared memory controller 121. LSMC 121 includes: request manager 201; read controller 202; prefetch access generation logic (PAGL) 203; request pending table 204; prefetch buffers 205; LSMC buffer 206; write controller 207; power down controller 208; and read datapath 209.

Request manager 201 interfaces with the corresponding CPU interface. Request manager 201 decodes the requests from CPU 111 and controls the different blocks with in LSMC 121. Request manager 201 handles the lookup of the prefetch buffers and figures out if a CPU 111 access hits or misses the prefetch buffers. Request manager 201 generates a system ready signal taking individual components of ready from read controller 202 and write controller 209. Request manager 210 controls read datapath 209 to CPU 111. Request manager 121 submits the read requests and prefetch requests to CSMC 129.

Read controller 202 manages all the read requests that go to memory banks 131, 132, 133 and 134. Read controller 202 contains per bank state machines that submit read requests to CSMC 129. Read controller 202 contains logic to stall CPU 111 using the cready signal.

Prefetch access generation logic 203 generates the prefetch requests to CSMC 129 to fill prefetch buffers 205. PAGL 203 calculates the addresses to be prefetched based on the type of access by CPU 111. Request manager 201 controls PAGL 203 when killing or aborting a prefetch request.

Request pending table 204 maintains the status of access requests and prefetch requests. Request pending table 204 splits incoming acknowledge signals from CSMC 129 for requests sent from LSMC 121 into real access and prefetch acknowledgments. Real access acknowledgments are routed to CPU 111 and read controller 202. Prefetch acknowledgments are routed to prefetch buffers 205. Request pending table 204 includes a number of entries direct mapping the number of logical memory banks 131, 132, 133 and 134.

Prefetch buffers 205 include data buffers with each logical memory bank 131, 132, 133 and 134. Thus the preferred embodiment includes four data buffers. Prefetch buffers 205 store prefetched data and address tags. Whenever a stored address tag matches the address of an access on the CPU interface and the prefetch data is valid, this data is directly forwarded from prefetch buffers 205 to CPU 111 without fetching from memory.

LSMC buffer 206 is a per-CPU command register which buffers the address and control signals on every access from the CPU. In the case of a write access, LSMC buffer 206 also buffers the write data.

Write controller 207 handles write requests from CPU 111. Writes use a token-based protocol. CSMC 129 has 4 per-bank write buffers. Writes from all CPUs arbitrate for a write token to write into the per-bank write buffers. Write controller 207 handles the token request interface with CSMC 129.

Power down controller 208 communicates with its counterpart in CSMC 129. Whenever the CSMC 129 power down controller requests a sleep or wakeup, power down controller 208 ensures that LSMC 121 is in a clean state before allowing the CSMC 129 power down controller to proceed.

Read datapath 209 receives control signals from request manager 201 corresponding to the type of access. Read datapath 209 multiplexes data from either prefetch buffer 205 or the memory data from CSMC 129 which is registered and forwarded to CPU 111.

Central shared memory controller (CSMC) 129 includes: request manager 301; arbiter 302; write buffer manager 303; datapath 304; register interface 305; and power down controller 306.

Request manager 301 receives requests from all CPUs 111 to 116. Request manager 301 submits these requests to a corresponding per-bank arbiter. Request manager 310 generates the memory control signals based on the signals from the CPU which won the arbitration. Request manager 301 contains the atomic access monitors which manage atomic operations initiated by a CPU.

Arbiter 302 is a least recently used (LRU) based arbiter. Arbiter 302 arbitrates among requests from all six CPUs for each memory bank 131, 132, 133 and 134. Arbitration uses the following priority. Write requests have the highest priority. Only one write request will be pending to any particular bank at a time. Real read requests have the next lower priority. A real read request is selected only if there are no pending write requests from any CPU. Prefetch requests have the lowest priority. Prefetch requests are selected only if there are no write requests or real read requests from any CPU.

Among CPUs requesting access at the same priority level, arbiter 302 implements a standard LRU scheme. Arbiter 302 has a 6 bit queue with one entry per CPU in each queue. The head of the queue is always the LRU. If the requester is the LRU, then it automatically wins the arbitration. If the requester is not the LRU, then the next in the queue is checked and so on. The winner of a current arbitration is pushed to the end of the queue becoming the most recently used. All other queue entries are pushed up accordingly.

Write buffer manager 303 contains per-bank write buffers. Write buffer manager 303 interfaces with the token requests from a write controller 207 of one of the LSMCs 121 to 126. Token arbitration uses a LRU scheme. Each per-bank write buffer of write buffer manager includes six finite state machines, one for each CPU. These finite state machines control generation of token requests to arbiter 302. Write buffer manager 303 registers and forwards the token grant from arbiter 302 to the corresponding CPU. Upon receiving the token grant the CPU has control of the per-bank write buffer and proceeds with the write.

Datapath 304 multiplexes between data from different memory pages and forwards data to the LSMC of the CPU which won the arbitration.

Register interface 305 supports a VBUSP interface through which software can program several registers. These registers control the operation of shared memory controller 120. Signals are exported from the register interface to different blocks in LSMCs 121, 122, 123, 124, 125 and 126 and CSMC 129.

Power down controller 306 interfaces with the programmable registers through which software can request a sleep mode or wakeup of memory banks 131, 132, 133 and 134. Power down controller 306 interfaces with the power down controller 208 of each LSMC 121, 122, 123, 124, 125 and 126, and memory wrappers to put the memory banks 131, 132, 1332 and 134 into sleep mode and wakeup.

Figure 4:
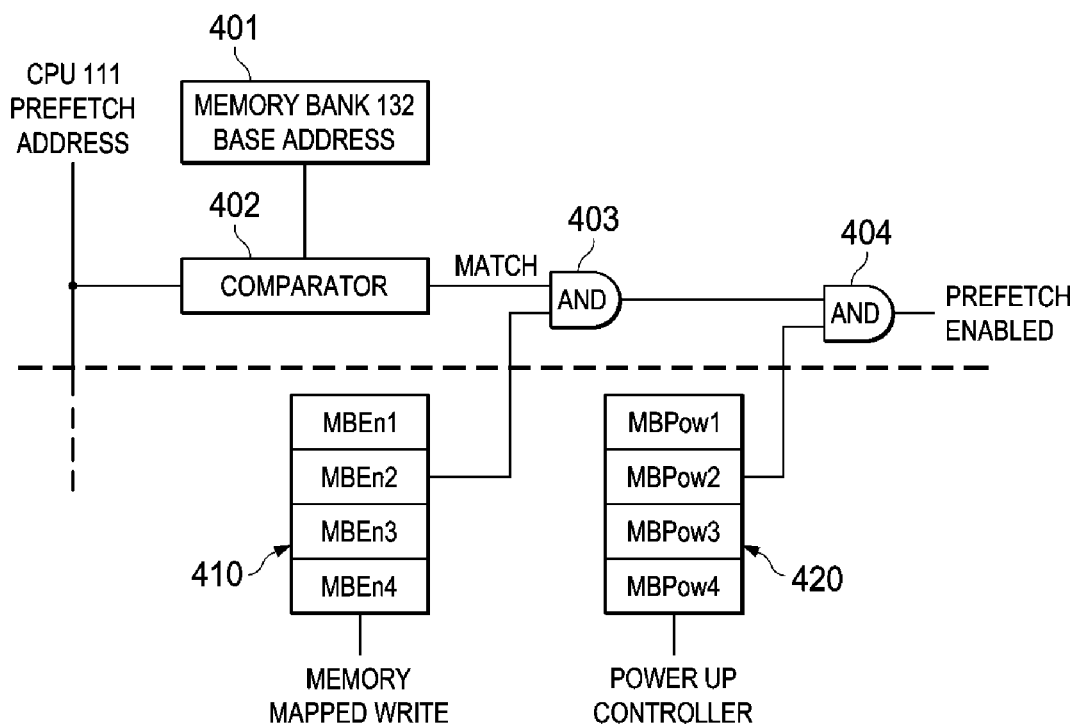
FIG. 4 is a block diagram of the power controller portion of the this invention.

FIG. 4 is a block diagram of an exemplary implementation of this invention. Circuits above the dashed line are provided for each memory bank. Circuits below the dashed line are common to the set of memory banks. In the example illustrated in FIG. 4, CPU 111 generates a prefetch request including a prefetch address. Memory bank 132 base address register 401 stores the base address of memory bank 132. This base address is supplied to comparator 402 together with the prefetch address from CPU 111. Comparator 402 generates a match signal if the CPU 111 prefetch address falls within the address range of memory bank 132. This is known as a bank hit. Memory banks such as memory banks 131, 132, 133 and 134 illustrated in FIG. 1 are customarily implemented having an integral power of 2 addresses $2^N$, where N is an integer. The bank hit decision can be made by comparing the appropriate most significant address bits of the CPU 111 prefetch address and the memory bank 132 base address.

Comparator 402 generates a match signal upon detection of a bank hit, that is, if the prefetch address is within the address range of memory bank 133. Prefetch enable register 410 stores bits that determine whether prefetch to particular memory banks is enabled. A 1 indicates that prefetch is enabled, a 0 indicates prefetch is disabled. Prefetch enable register 410 is alterable by memory mapped write via register interface 305 as described above. Thus one or more of CPUs 111 to 116 controls prefetch enable for individual memory banks 131 to 132. Power up register 420 stores bits that correspond to the powered state of particular memory banks. A 1 indicates that the corresponding memory bank is powered, a 0 indicates the corresponding memory bank is not powered. Power up register 420 is controlled by the power up controller 306 of the memory banks to reflect the current status of the memory bank.

AND gate 403 receives the match signal from comparator 402 and the corresponding bit enable MBEn2 from prefetch enable register 410. AND gate 403 generates a 1 output upon a match signal to a memory bank with prefetch enabled. AND gate 403 generates a 0 output if either there is no bank hit or the memory bank has prefetch disabled. AND gate 404 receives the output of AND gate 403 and the corresponding power bit MBPow2 from power up register 420. AND gate 404 generates a 1 upon a bank hit on a prefetch to a prefetch enabled and powered memory bank. AND gate 404 generates a 0 on failure of any of these conditions. The output of AND gate 404 is a prefetch enable signal to memory bank 132 permitting prefetch accesses. Those skilled in the art would realize that AND gates 403 and 404 could be realized by a single combined AND gate.

Separate conditioning of the prefetch on an independent prefetch enable and power signal reduces the complexity of interaction between these two conditions. Software will generally deal with prefetch enable and hardware will generally deal with memory bank power. The circuit of FIG. 4 enables these domains to operate correctly without elaborate structures for interaction.

What is claimed is:

1. A prefetch controller in a shared memory multiprocessor system comprising:
   a memory bank base address register for each of plural independently addressable memory bank of said shared memory system storing a corresponding memory bank base address;
   a plurality of comparators one for each independently addressable memory bank of said shared memory system connected to a corresponding memory bank base address register and receiving a prefetch address, having an output generating a match signal if a prefetch address is within an address range of said corresponding memory bank;
   a memory bank prefetch enable register having a memory bank prefetch enable bit corresponding to each independently addressable memory bank having a first digital state indicating prefetch is permitted to said corresponding memory bank and a second digital state indicating that prefetch is not permitted to said corresponding memory bank;
   a memory bank power up register having a power bit corresponding to each independently addressable memory bank having a first digital state indicating said corresponding memory bank is powered and a second digital state indicating said corresponding memory bank is not powered; and
   a logic network for each independently addressable memory bank of said shared memory system connected to said comparator, a corresponding prefetch enable bit and a corresponding power bit, said logic network generating a prefetch enable signal enabling prefetch to said corresponding memory bank if said comparator generates said match signal, said memory bank prefetch enable bit has said first digital state and said power bit has said first digital state.

2. The prefetch controller of claim 1, wherein:
   said memory bank prefetch enable register is memory mapped writeable by at least one processor of said multiprocessor system.

3. The prefetch controller of claim 1, wherein:
   said memory bank power up register is writeable by a hardware power up controller controlling supply of power to said memory banks.

4. A method of prefetch control in a shared memory multiprocessor system comprising the steps of:
   storing a memory bank base address corresponding to each of plural independently addressable memory bank of said shared memory;
   for each of said plural independently addressable memory bank of the shared memory comparing a corresponding memory bank base address to a prefetch address and generating a match signal if said prefetch address is within an address range of said corresponding memory bank;
   a storing a memory bank prefetch enable bit corresponding to each independently addressable memory bank having a first digital state indicating prefetch is permitted to said corresponding memory bank and a second digital state indicating that prefetch is not permitted to said corresponding memory bank;
   a storing a power bit corresponding to each independently addressable memory bank having a first digital state indicating said corresponding memory bank is powered and a second digital state indicating said corresponding memory bank is not powered; and
   enabling prefetch to said corresponding memory bank if said comparison generates said match signal, said memory bank prefetch enable bit has said first digital state and said power bit has said first digital state.

* * * * *